United States Patent [19]

Coudriet et al.

[11] Patent Number: 5,198,125
[45] Date of Patent: Mar. 30, 1993

[54] METHOD AND APPARATUS FOR SLUDGE COLLECTION

[76] Inventors: Lawrence A. Coudriet, 202 Trail Side Dr., Sewickley, Pa. 15143; Thomas B. Zugates, 417 Oaklawn Dr., Pittsburgh, Pa. 15241

[21] Appl. No.: 679,726

[22] Filed: Apr. 3, 1991

[51] Int. Cl.$^5$ .............................................. B01D 21/04
[52] U.S. Cl. ...................................... 210/803; 210/531
[58] Field of Search .................... 210/242.1, 531, 523, 210/803, 527, 739; 318/490

[56] References Cited

U.S. PATENT DOCUMENTS

| | | | |
|---|---|---|---|
| 1,916,460 | 7/1933 | Bousman | 210/525 |
| 2,033,500 | 3/1936 | Wiard | 210/55 |
| 2,305,929 | 12/1942 | Lund et al. | 210/3 |
| 2,670,080 | 2/1954 | Scott | 210/55 |
| 2,692,680 | 10/1954 | Scott | 210/55 |
| 3,333,704 | 8/1967 | McGivern | 210/242.1 |
| 3,526,591 | 9/1970 | Hampton | 210/525 |
| 3,557,964 | 1/1971 | Quast | 210/531 |
| 3,797,664 | 3/1974 | Pentz et al. | 210/83 |
| 3,807,560 | 4/1974 | Pentz et al. | 210/83 |
| 3,933,655 | 1/1976 | Grzina et al. | 210/528 |
| 4,046,700 | 9/1977 | Glover | 210/523 |
| 4,141,832 | 2/1979 | Minbiole | 210/195 |
| 4,367,141 | 1/1983 | Dorombozi et al. | 210/145 |
| 4,401,576 | 8/1983 | Meuer | 210/803 |
| 4,462,908 | 7/1984 | Eichler et al. | 210/531 X |

FOREIGN PATENT DOCUMENTS 2718269 10/1978 Fed. Rep. of Germany.
1574158 11/1969 France.

Primary Examiner—Frank Spear
Attorney, Agent, or Firm—John M. Adams

[57] ABSTRACT

An upper carriage floats on the surface of a settling pond or tank of liquid containing sedimentation settled out to form a bed of sludge in the bottom of the tank. A scraper assembly is suspended from the upper carriage by flexible cables or chains to a preselected depth in the tank. Scraper blades supported by the scraper assembly extend downwardly into contact with the sludge bed. The carriage is propelled on a looped cable across the surface of the tank and applies a tractive force through the suspension cables to the scraper assembly. As the submerged scraper assembly advances, the scraper blades apply a shear force to dislodge the sludge from the bed and direct the sludge to a pump carried on the submerged scraper assembly. The dislodged sludge is pumped through a hose from the tank. In response to an excessive shear load applied by the sludge bed resisting forward movement of the scraper blades tending to force the leading edge of the assembly to move downwardly, the length of the leading cables is shortened to raise the leading edge to a position to permit continued shearing action of the scraper blades.

24 Claims, 9 Drawing Sheets

METHOD AND APPARATUS FOR SLUDGE COLLECTION

BACKGROUND OF THE INVENTION

1. Field of the Invention

This invention relates to method and apparatus for removing settled solids from basins and formed tanks and more particularly to a scraper blade assembly operable to apply a shear force to a sludge bed to dislodge the sludge for collection and removal.

2. Description of the Prior Art

Apparatus for removing solids/sediment from settling tanks, basins and the like are well known in the art, such as disclosed in U.S. Pat. Nos. 1,916,460; 2,033,500; and 2,305,929. The settling tanks are conventionally utilized for solids removal from sewage, clarifying a discharge stream, or thickening a process stream which has settled to the bottom of the sedimentation basin.

In sewage plants, for example as disclosed in U.S. Pat. No. 1,916,460, it is necessary to periodically remove the sludge from the pond or basin by traversing a carriage above the surface of the pond on rails and suspending from the carriage a scraper assembly which is submerged in contact with the sludge. Movement of the carriage propels the scraper assembly through the sludge to dislodge the sludge. A pair of scraper blades converging rearwardly toward a discharge end of the basin moves the sludge to a collection point or sump in the basin. A suction nozzle of a pump immersed into the sump withdraws the dislodged sludge from the basin for subsequent processing. When the carriage completes a pass of the basin, the position of the scraper blades is reversed from traverse in the opposite direction across the basin. Also the position of the scraper blades is vertically adjustable on the carriage to permit the blades to be raised and lowered at the end of each pass for repositioning.

It is also known to utilize a rotating rake mechanism suspended in a circular settling basin to d the sludge and transport it to a drawoff point for pumping to a subsequent point for further process. In the event the rotating rake arms encounter excessive resistance to rotation by the sludge bed, the rake arms must be raised to reduce the depth they are positioned in the bed. In this manner, the rotating arms can overcome the resistance to rotation presented by the sludge bed. However, one problem encountered with this arrangement is balancing the inflow of suspended solids with the rake gathering capacity and pump capacity. As the level of the sludge bed rises, the density and viscosity of the pumped mixture often increases, thus producing a reduction in the pumping rate or a complete blockage of the pumping system. If the level of the settled sludge continues to rise, then the sludge collection process must be interrupted to prevent damage to the rotating rake mechanism. The settling basin must be drained to permit removal of the sludge before operation of the clarifier unit can be continued.

Another known device for removing sludge from a collection tank is a powered rotary auger type of dredge device. This device requires supervision by operating personnel while it stirs and agitates the sludge bed to effect its removal. Another device is known to employ a floating platform with a submersible pump and mixer suspended beneath the platform. In operation the settled solids are resuspended, but this results in dilution of the underflow stream and disturbance of the clarification process.

Another known floating device for sludge removal uses a traveling submerged perforated suction pipe attached to a suction inlet of a vertical pump. This device is prone to blockage of the inlet perforations, making it difficult to control the density of the pumped material. When the device encounters a stationary obstruction in the basin, the resistance to movement of the device exceeds the capacity of the tractive winch, and the device stalls.

Similar problems are encountered with an arrangement of translating scraper blades in overcoming the resistance to shear offered by the sludge bed. As the scraper blades are advanced by traversing movement of the carriage above the basin, the sludge is dislodged from the bottom of the basin by shearing action of the scraper blades in contact with the sludge. The blades must apply a shear load or force which exceeds the shear strength of the deposited sludge in order to dislodge the sludge. The resistive shear load is determined, in part, by the configuration of the scraper blades and the sludge characteristics. Therefore, in order to dislodge the sludge from the fixed bed, the load applied to the scraper blades must exceed the shear strength of the sludge bed.

Once the sludge is sheared, the pumping rate must be controlled in response to the changing density and viscosity of the pumped media. If the viscosity is too high, pump rates may be reduced or entirely stopped. This in turn will result in solids build up in the clarifier and eventual disruption of the clarification process. On the other hand, if the viscosity of the pumped media is too low, then excessive liquid is pumped which does little to remove the solids from the clarification basin and defeats the purpose of the liquid-solid separation process. Similarly, if the solids inflow into a conventional clarification devices exceeds the design limits regarding sludge gathering or pumping, the solids level will rise. This may result in stalling the gathering mechanism or increasing the sludge viscosity so that the rate of solids removal through the disposal pump is reduced or entirely stopped. Again the clarification process is disrupted.

While scraper devices are known for dislodging sludge from settling basins, the known devices are prone to stalling on overload or producing sludge so dense that it cannot be pumped. Therefore, there is need for sludge removal apparatus capable of responding to a variety of shear strength characteristics of the sludge bed by adjusting the position of the scraper assembly relative to the sludge bed to dislodge the sludge in a quiescent manner with a minimum of agitation.

SUMMARY OF THE INVENTION

In accordance with the present invention, there is provided apparatus for sludge collection that includes an upper carriage and a scraper assembly having a leading edge. Suspension means suspends the scraper assembly from a carriage at a desired depth in relation to a sludge bed in a settling tank. The suspension means includes a plurality of leading suspension members extending between the scraper assembly and the upper carriage. Means are provided for shortening the length of the leading suspension members upon encountering increased load or an obstruction to raise the leading edge of the scraper assembly to permit the scraper assembly to traverse the obstruction or reduce the load.

The scraper assembly has a centrally located sludge collector. Pump means delivers dislodged sludge from the central sludge collector out of the settling tank. Means is provided for moving the upper carriage to position the scraper assembly relative to the sludge bed.

Further, in accordance with the present invention, there is provided apparatus for sludge collection that includes an upper carriage and a scraper assembly having a leading edge for shearing sludge from a sludge bed fixed in a settling tank and a trailing edge. Tractive means applies a design tractive force to the upper carriage to propel the carriage and advance the scraper assembly to shear sludge from the fixed bed. Suspension means extends between the scraper assembly and the carriage for suspending the scraper assembly from the carriage at a desired depth in relation to the sludge bed in the settling tank. The suspension means includes leading suspension members. Adjusting means changes the length of the leading suspension members between the upper carriage and the scraper assembly to raise the leading edge above the trailing edge in the direction of travel of the scraper assembly. Means is provided for initiating a change in the length of the leading suspension members when the resistive force applied by the sludge bed to the shearing action of the scraper assembly exceeds the design tractive force applied to the upper carriage. Means movable with the scraper assembly is provided for pumping the sludge sheared from the fixed bed out of the settling tank.

Additionally, the present invention is directed to a method for removing sludge from a pond or a settling tank that includes the steps of suspending a submerged scraper assembly from a floating carriage. The suspension of the submerged scraper is adjusted in relation to the sludge present in the settling tank. The sludge is collected in a sludge collector at the center of the scraper assembly. The sludge is pumped from the sludge collector. The floating carriage is translated back and forth along the length of the settling tank.

Accordingly, the principal object of the present invention is to provide method and apparatus for dislodging and removing sludge, sediment and the like collected in a settling tank by translating a scraper assembly through the sludge bed to shear layers of sludge from the bed, gather the dislodged sludge and pump the dislodged sludge from the settling tank.

Another object of the present invention is to provide method and apparatus for supporting an assembly of scraper blades in a settling tank containing liquid with a submerged bed of sludge where the scraper blades are selectively positioned at a desired depth and translated relative to the sludge to exert a desired shear force upon the bed to dislodge the sludge as the scraper blades are translated back and forth in contact with the sludge bed.

Another object of the present invention is to provide method and apparatus for suspending a set of scraper blades in contact with a sludge bed and translating the scraper blades to apply a selected shear load to the sludge bed to dislodge the sludge for removal with a minimum of agitation that prevents the dislodged sludge from becoming suspended in the liquid of the settling tank.

A further object of the present invention is to provide sludge collection apparatus that permits adjustments to be made in the positioning of an assembly of scraper blades in contact with a submerged sludge bed and operation of the scraper blades to efficiently dislodge sludge from the bed as the scraper blades are advanced in a traversing pattern through the sludge bed.

An additional object of the present invention is to provide method and apparatus for controlling the submerged position of a set of scraper blades and traversing of the scraper blades in response to obstructions encountered in shearing of sludge from the bed.

Another object of the present invention is to provide a method for controlling the position and movement of a submerged scraper blade assembly to provide optimum shearing of sludge from a fixed bed in a settling tank in response to the characteristics of the the dislodged sludge and in so doing assure the pumpability of the dislodged sludge by automatically limiting the density and viscosity of the pumped media.

These and other objects of the present invention will be more completely disclosed and described in the following specification, the accompanying drawings, and appended claims.

DESCRIPTION OF THE PREFERRED EMBODIMENTS

Figure 1:
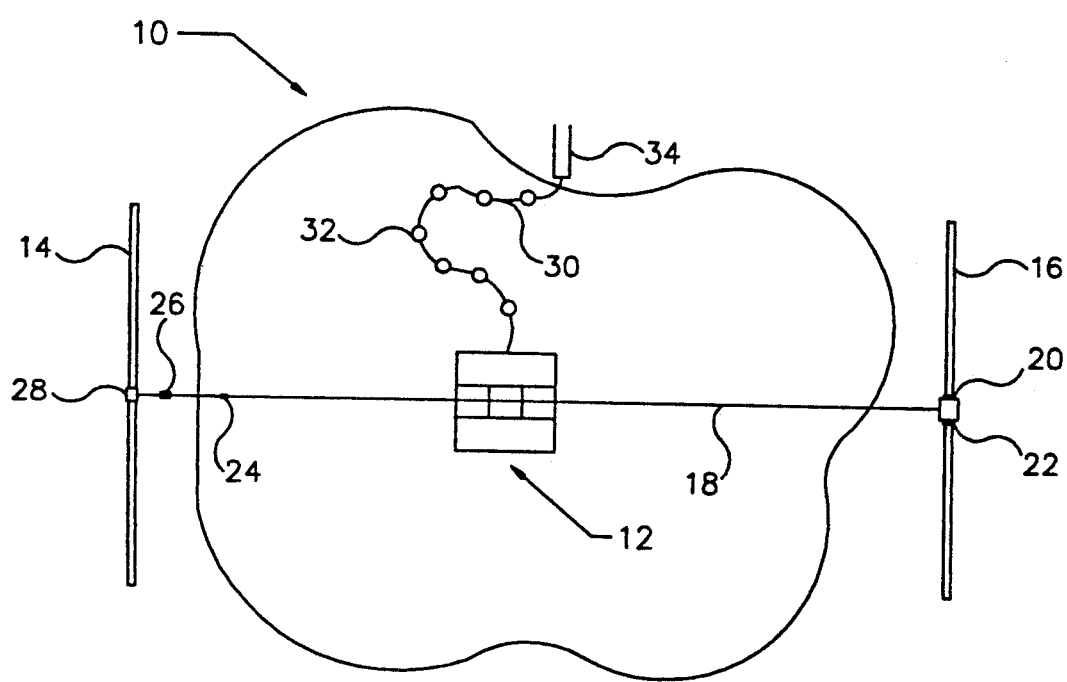
FIG. 1 is a schematic plan view of a settling tank containing a submerged sludge bed, illustrating the method and apparatus of the present invention for dislodging and removing the sludge from the settling tank.
Figure 2:
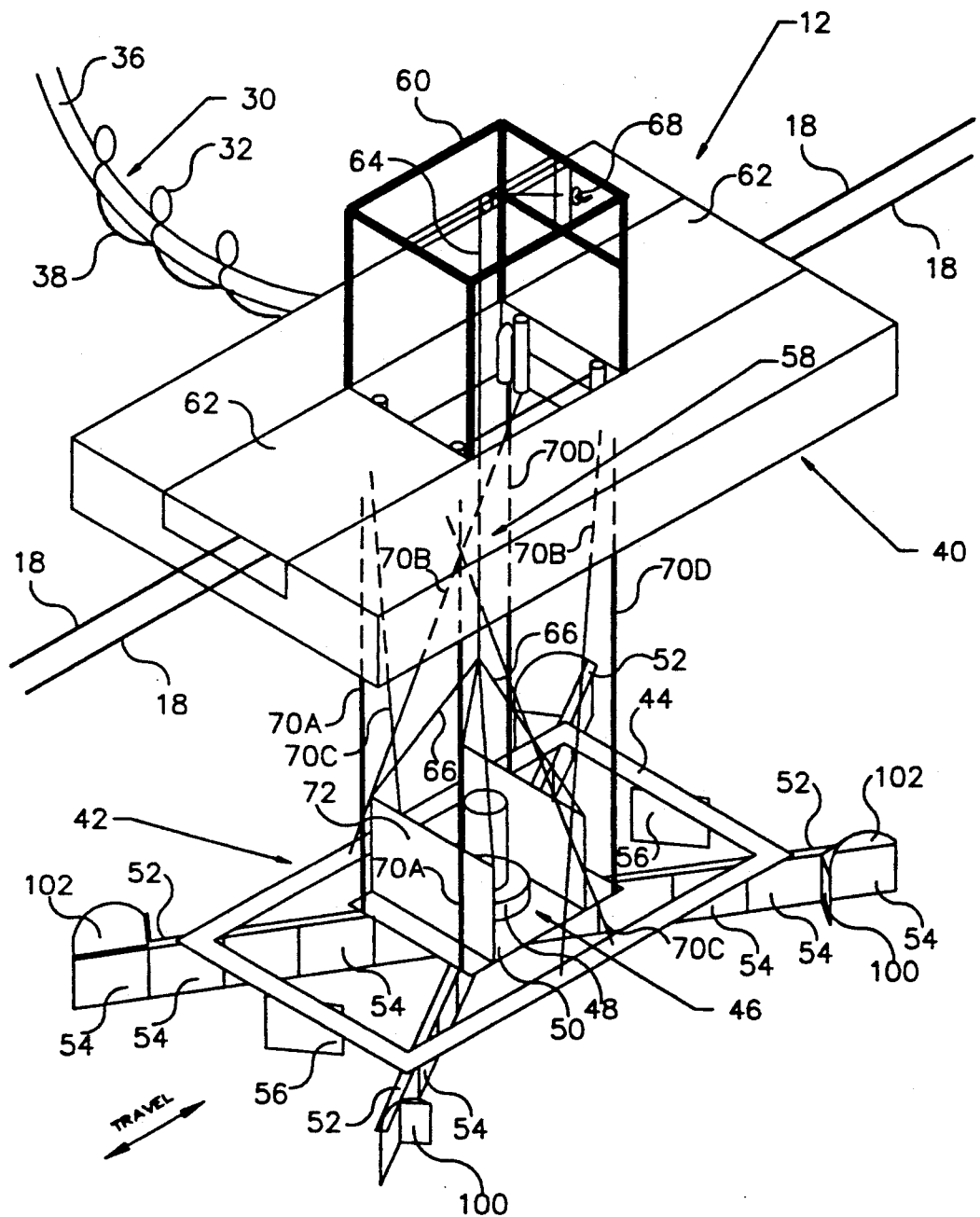
FIG. 2 is a schematic isometric view of the sludge collection apparatus in accordance with the present invention.

Referring to the drawings and particularly to FIGS. 1 and 2, there is illustrated in FIG. 1 a settling tank 10 that is conventionally known in the use for clarifying a discharge stream or thickening a process stream which is settled at the bottom of the tank. The tank 10 may be in the form of an earthen basin or any other type of vessel typical for receiving and containing liquid with sedimentation where the sediment settles out to form a bed of sludge in the bottom of the tank. In accordance with the present invention a sludge collection apparatus generally designated by the numeral 12 is floatably positioned in the settling tank 10 for removing the sediment, sludge or the like which is collected at the bottom of the tank 10. The sludge collection device in one embodiment is shown in FIGS. 1 and 2 as connected to a pair of slide rails 14 and 16 by a suspension system that includes a looped cable 18 having a pair of strands secured to the rails 14 and 16. The rails 14 and 16 are securely mounted oppositely of one another to facilitate extension of the looped cable 18 across the tank 10 for traversing the sludge collection apparatus 12 along the cable 18 in a translating movement in the settling tank 10.

The sludge collection apparatus 12 is attached to a propulsion system at opposite sides of the looped cable 18. One side of the loop of the cable 18 is wrapped around a winch 20 which is slidably connected by a mechanism 22 on the rail 16. The opposite side of the looped cable 18 is connected through a return sheave 24 to a take-up device 26 which is in turn connected to an attachment shoe 28. With this arrangement, operation of the winch 20 generates longitudinal movement of the strands of the looped cable 18 as the cable follows a closed path between the rails 14 and 16. The take-up device 26 permits adjustments to be made in the tension of the cable 18. The attachment shoe 28 is mounted in a suitable fashion on the rail 14 so that upon actuation of the slide mechanism 22 associated with rail 16, the winch 20 on rail 16 and the attachment shoe 28 on rail 14 are movable together along the length of the respective rails 14 and 16 to selectively position the cable 18 for traversing the sludge collection apparatus 12 over the entire area of the settling tank 10.

As will be explained later in greater detail the sludge collection apparatus 12 is operable to dislodge in a shearing action layers of sludge, which have collected on the bottom of the tank 10, as the apparatus 12 traverses back and forth on the cable 18 between the rails 14 and 16. As the sludge is dislodged in a shearing type of action it is gathered into the collection apparatus 12 and pumped therefrom through a discharge assembly generally designated by the numeral 30 in FIGS. 1 and 2. The discharge assembly 30 is supported by floats 32 on the surface of the liquid in the settling tank 10. The sludge material that is pumped through the discharge assembly 30 is deposited at a discharge point 34 positioned on solid ground adjacent the settling tank 10.

As shown in FIG. 2, operation of the powered devices on the collection apparatus 12 is accomplished by the supply of electrical power through a power and control cable 38 which is supported by hose 36, comprising the discharge assembly 30. The dislodged sludge material is conveyed through the hose 36 to the shore discharge point 34.

Figure 3:
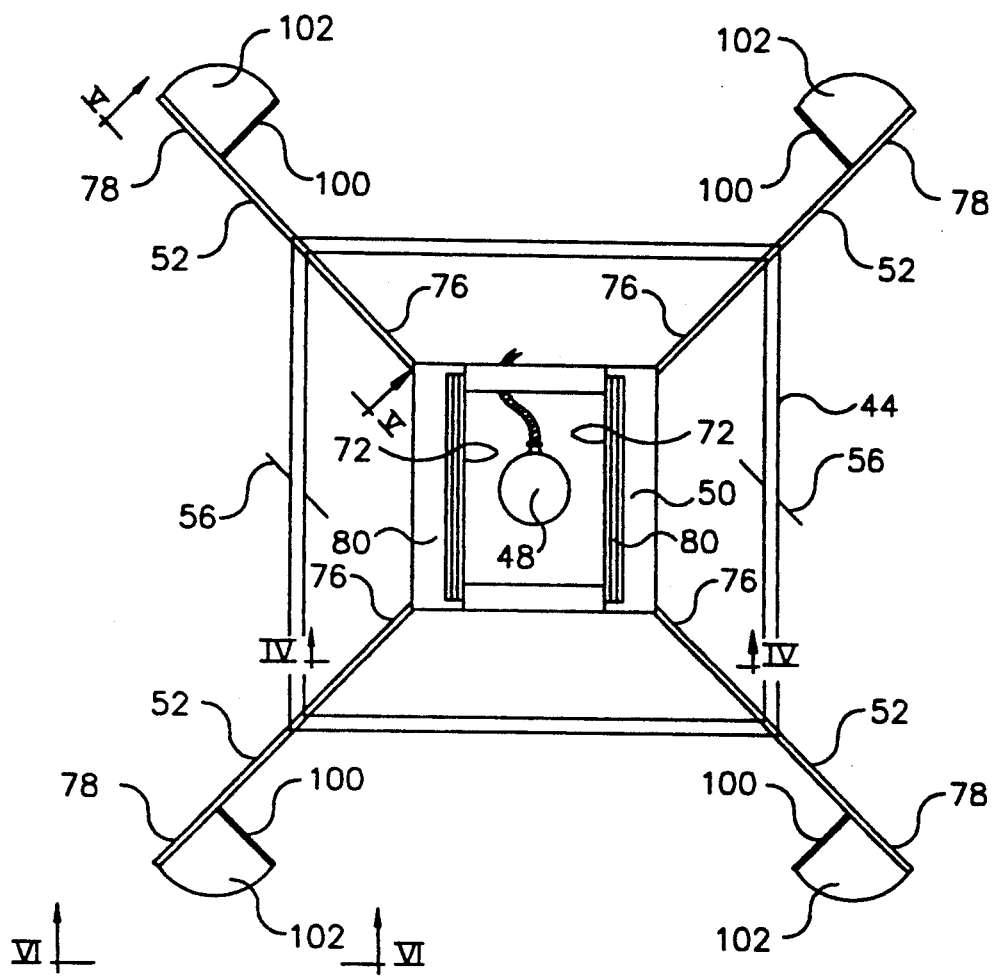
FIG. 3 is a schematic plan view of a scraper blade assembly of the sludge collection apparatus shown in FIG. 2.
Figure 4:
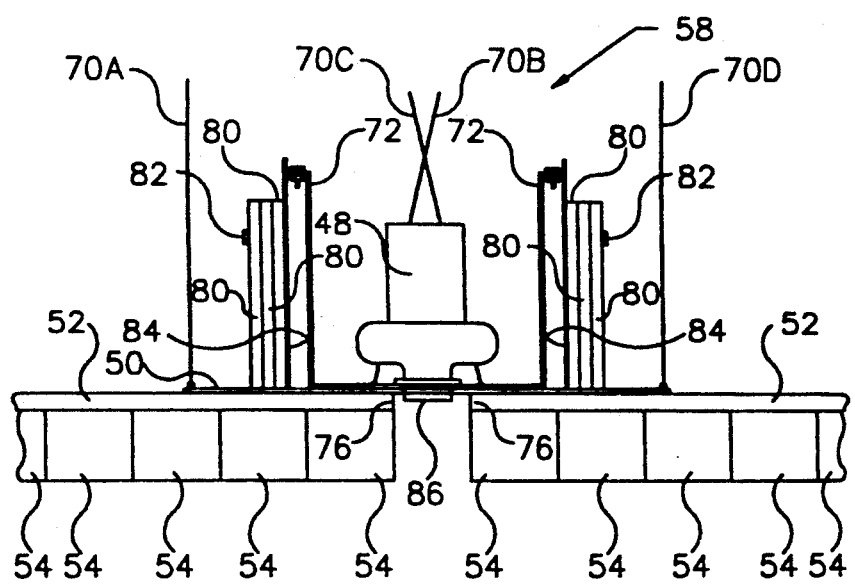
FIG. 4 is a schematic fragmentary view in side elevation of the scraper blade assembly shown in FIG. 3.

Referring in greater detail to FIGS. 2-4 the sludge collection apparatus 12 includes a floatable upper carriage assembly generally designated by the numeral 40 and a lower carriage or scraper assembly generally designated by the numeral 42 which is submerged below the surface of the liquid in the settling tank 10. The lower carriage assembly 42 includes a frame 44 on which is positioned a submersible pump assembly generally designated by the numeral 46 in FIG. 2. The pump assembly 46 includes a pump 48 supported on the frame 44 by a pump frame 50. Secured to and extending from the frame 44 are a plurality of scraper blade support arms 52 having a plurality of individually pivotal scraper blades 54 secured thereto. Auxiliary blades 56 are also connected to extend downwardly from the frame 44.

The scraper assembly 42 is initially positioned relative to the upper carriage assembly 40 by a lifting system of cables generally designated by numeral 58 in FIG. 2. The lifting system 58 is connected at a lower end portion to the frame 44 and at an upper end portion to a lifting frame 60 mounted on the upper carriage assembly 40. One strand of looped cable 18 extends through the upper carriage assembly 40 while the cable ends of the opposite strand are accessible for mounting purposes through removable access hatches 62 provided on opposite ends of the assembly 40 as shown in FIG. 2.

The lifting system 58 includes a main lifting cable 64 connected at its lower end portion to a plurality of secondary lifting cables 66 that are in turn connected at their end portions to the submerged frame 44. The upper end portion of the main lifting cable 64 extends around a pulley for connection to a lifting winch 68. With this arrangement the lower submerged scraper blade assembly 42 is raised and lowered to a preselected depth in the settling tank 10.

Once the scraper assembly 42 is lowered to a preselected depth in the settling tank 10 for engagement of the scraper blades 54 and 56 with the sludge bed, cables 64 and 66 are set to a slack configuration where they support no load. In so relieving load on cables 64 and 66, all load is transferred to a suspension system 70. The floating upper carriage assembly 40 is then propelled by movement of the looped cable 18. Movement of the upper carriage assembly 40 exerts a tractive force through suspension system 70 upon the submerged scraper assembly 42 to propel the scraper blades 54 and 56 into contact with the sludge bed. In this manner, a shear force is applied by the scraper assembly 42 to the bed to dislodge the sludge material. The sludge bed presents to the scraper assembly 42 a resistance force or a resistive shear load as the upper carriage assembly 40 applies a tractive force to the scraper assembly 42. The dislodged sludge is gathered and directed by the scraper blades 54 centrally relative to the frame 44 for collection and removal from the tank 10 by the pump 48. The pump 48 directs the dislodged sludge into the hose 36.

The lower carriage assembly or scraper assembly 42 travels in the direction of the tractive force generated by the movement of the upper carriage assembly 40. The relative angular position and depth of the scraper assembly 42 is adjustable by the suspension system 70 connected at one end to the frames 44 and 50 that supports the pump 48 on the assembly 42. As will be explained later in greater detail the suspension system 70 is adjustable to raise and lower a leading edge 74 of the scraper assembly 42 in response to the resistive shear load applied by the sludge bed to the tractive force exerted through the scraper blades 54 and 56 upon the sludge bed.

Now referring to FIGS. 3 and 4, there is illustrated the details of the lower carriage or scraper assembly 42. As discussed above, the scraper assembly 42 is suspended from the upper carriage assembly 40 which floats on the surface of the liquid in the settling tank 10 and is propelled in a traversing pattern back and forth in the settling tank 10 on the looped cable 18. The working depth to which the scraper assembly 42 is initially submerged in the settling tank 10 is established by the lifting system 58, but later maintained by the suspension system 70. The suspension system 70 includes adjustable cables, flexible chains or the like 70A, 70B, 70C, and 70D.

Figure 10:
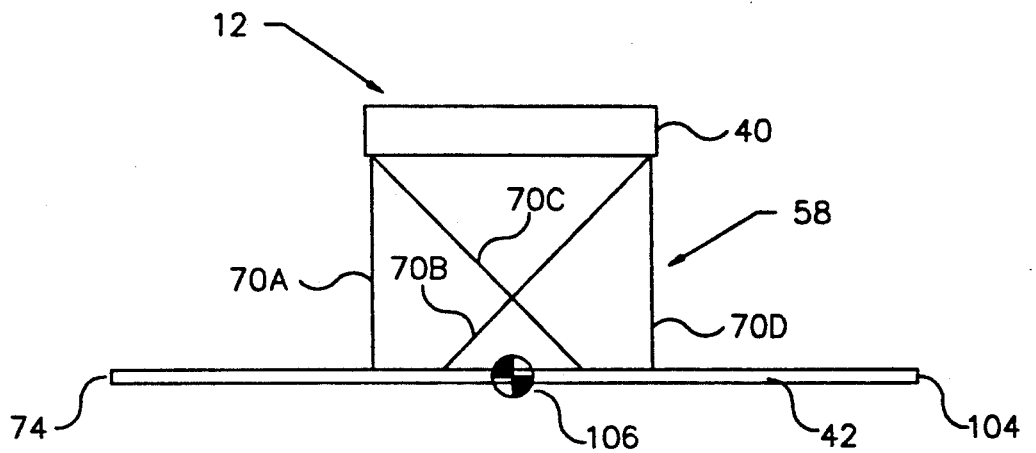
FIG. 10 is a schematic illustration of the static position of the scraper blade assembly supported beneath a carriage assembly which is propelled above the submerged sludge bed.

The connections of the suspension system 70 between the upper carriage assembly and the scraper assembly 42 maintains horizontal positioning of the frame 44 submerged in the settling tank in a static condition, as schematically illustrated in FIG. 10. Preferably the horizontal positioning of the frame 44 is maintained during tractive traversing movement of the upper carriage 40 as the sludge is progressively sheared from a fixed position in the settling tank. With the arrangement of suspending the scraper assembly 42 by flexible chains or cables 70A, 70B, 70C, and 70D from the floating upper carriage assembly 40, the scraper assembly 42 is maintained stable to perform the normal shearing operations.

The principal components of the scraper assembly 42 include the centrally located pump assembly 46 mounted on frame 72 which in turn is connected to the frame 44. Scraper blades 54 and 56 are arranged in a preselected configuration to facilitate the dislodgement of sludge from the bed and the channeling or directing of the is dislodged sludge toward the pump assembly 46. As seen in FIGS. 2 and 3 the plurality of scraper blade support arms 52 are connected to the frame 44 to form a V-like configuration by the diagonal orientation of the arms 52 relative to the frame 44 as clearly seen in FIG. 3. Each of the scraper blade support arms 52 includes a first end portion 76 connected to the frame 50 beneath the frame 72 for the pump 48 and the second or free end portion 78.

Figure 7:
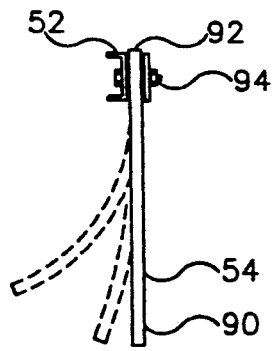
FIG. 7 is a schematic view in side elevation of a scraper blade mounted to a scraper arm of the assembly shown in FIG. 4, illustrating in phantom a deflected position of a scraper blade.
Figure 8:
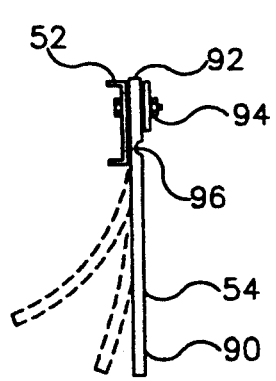
FIG. 8 is a view similar to FIG. 7, illustrating a flexible hinged embodiment of the scraper blade.
Figure 9:
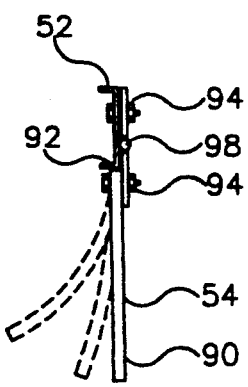
FIG. 9 is a view similar to FIGS. 7 and 8, illustrating a conventionally hinged embodiment of the connection of a scraper blade to the scraper arm.

Extending downwardly from the scraper blade support arms 52 are a plurality of scraper blades 54 which are each hingedly connected, in a manner as illustrated in FIGS. 7-9, to the support arms 52. With this arrangement the individual blades 54 are movable relative to one another with respect to the support arm 52. With the V-like positioning of the scraper blade support arms 52 on the frame 44 the arms 52 diverge outwardly away from the frame 44. The distance between the end portions 76 of the arms 52 is less at one end than the distance between the free end portions 78 at the opposite ends of the arms 52. Thus the scraper arms 52 form an open end portion to receive the sludge bed in the direction of travel by the converging pattern of the arms 52.

The dislodged sludge is directed inwardly toward the pump 48. Also, in accordance with the present invention, the support arms 52 may be positioned in a X-like configuration and, as in the above arrangement, the settled sludge bed is sheared and displaced and directed centrally toward the inlet of pump 48 which is located at the base of the X-like blades. It should be understood that the individual scraper blades 54 have a preselected length and when combined with the vertical adjustment provided through the suspension system 70 the depth to which the scraper blades 54 act upon sludge bed is regulated.

The depth in which the scraper blades 54 act is controlled by the suspension system 70. Also, the degree to which the scraper blades 54 penetrate the sludge bed to remove a layer of sludge is controlled by the suspension system 70. Therefore, once the scraper blade assembly 42 is lowered to a preselected depth by lifting system 58, the degree to which the scraper blades 54 penetrate or shear the sludge in the bed is also controlled. Upon each pass of the sludge bed, the assembly 42 positions the blades 54 to remove subsequently settled layers of sludge from the bed. In this manner, successive layers of sludge are removed, and the quantity of sludge removed from each layer is controlled. This prevents the difficulty of attempting to remove or dislodge more sludge in one pass than capable by the action of the scraper blades 54 and the capacity of the pump 48 to displace the dislodged sludge through the hose 36.

Another factor in determining the ability of the scraper assembly 42 to maintain its nominal undeflected position, shown in FIG. 10, within the settling tank is the weight of the assembly 42. Adjustments in the weight of the assembly 42 are made by the use of removable plates 80 as shown in FIGS. 3 and 4 on the pump frame 50. A selected number of plates 80 can be added to the frame 50. In one embodiment the individual plates 80 are removably connected by a fastener 82 that extends through the plates 80 into connection with a vertical plate 84 which in turn is bolted to the vertical plate 72 of the pump frame 50. Further, as seen in FIGS. 3 and 4 the pump 48 is centrally positioned on the frame 50 between the plates 72 and includes an inlet 86 that extends downwardly through the frame 50, as seen in FIG. 4, between the blade end portions 76 of the scraper blade support arms 52.

In addition to the scraper blades 54, auxiliary scraper blades 56 as shown in FIG. 2 are connected to the frame 44 centrally between the support arms 52 on opposite ends of the frame 44. The blades 56 are angled with respect to the frame 44 and are thus positioned within the gap of the area of sweep formed by the V-shaped scraper blade arms 52. The blades 56 are operable to assure that all of the sludge along the horizontal center line of the scraper assembly 42 is sheared from the fixed bed.

Preferably the individual scraper blades 54 on the scraper blade support arms 52 are in one embodiment fabricated of rigid material and in another embodiment fabricated of resilient material. Accordingly the choice of material is determined by the nature of the sludge bed and the degree of compaction of the sludge bed.

Referring to FIG. 7 there is illustrated a scraper blade 54 fabricated of a resilient material to permit deflection of the blade 54, as illustrated in phantom in FIG. 7, when moved into engagement with the sludge bed. The position of the blade shown in solid lines occurs when no loads are applied to the blade. Two deflected positions of the blade 54 are shown in phantom and occur when the scraper blades experience the application of load thereto. Each of the scraper blades 54 includes a lower or a free end portion 90 and an opposite or fixed end portion 92 that is connected by a nut and bolt combination 94 to the scraper blade support arm 52.

Another embodiment of the scraper blade 54 is shown in FIG. 8 and includes the same features as illustrated in FIG. 7 with the addition of a notch or recess 96 in the body of the blade 54 adjacent to its connection to the scraper blade support arm 52, as well as a further extension of support arm 52 to serve as a stop. The notch 96 serves as hinge to facilitate rotation of the resilient scraper blade 54 when the blade is in reverse travel. The hinged movement is allowed in one direction, but flexing under load can occur as shown. Two deflected positions are also shown in phantom in FIG. 8. The slightly deflected position of the blade occurs when a design load is applied to the scraper blade. The substantially deflected position of the blade occurs under overload conditions.

FIG. 9 illustrates an embodiment of the connection of the scraper blade 54 to the support arm 52 for mechanically hinged movement of the blade 54 in one direction while it undergoes flexing during forward travel. This is accomplished by connecting the blade end portion 92 to the support arm 52 by a two-way hinge 98 but extension of frame 52 will serve as a stop to prevent reverse rotation. Thus with this arrangement the scraper blade 54 also swings or deflects in the reverse direction of travel in the scraper assembly 42. Where the scraper blades 54 are hinged as shown in FIGS. 8 and 9, the hinged attachments are fabricated so as to present shearing action to the sludge bed when moved in their forward direction and not when pulled backward in a reverse direction. The size, thickness and resiliency of the material of the scraper blade is selected based on the desired deflection characteristics of the scraper blade. Also, the thickness of the scraper blade need not be uniform along its length.

Figure 5:
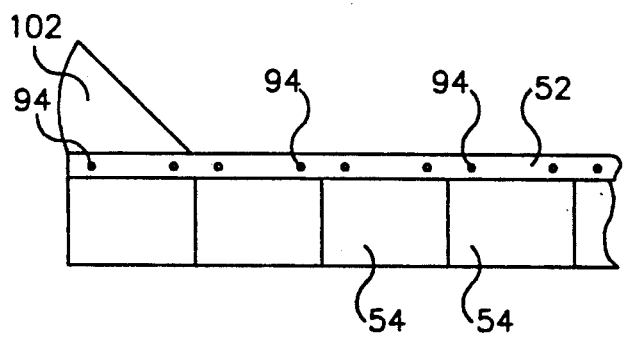
FIG. 5 is an enlarged fragmentary view in side elevation of a scraper arm of the assembly taken along line V—V of FIG. 3.
Figure 6:
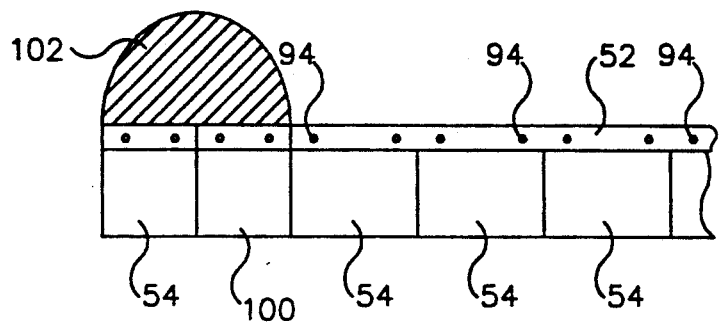
FIG. 6 is a view similar to FIG. 5 of the scraper arm taken along line VI—VI of FIG. 3, illustrating cowling mounted on the scraper arm.

In the event that the scraper blades are not hingedly connected to the scraper blade support arms 52, auxiliary scraper blades 100 and flexible cowling 102 are positioned at the end portions 78 of each scraper blade support arm 52, as shown in FIGS. 3, 5 and 6. The auxiliary scraper blades 100 and cowling 102 are preferably utilized when the scraper assembly 42 is submerged under a deep sludge bed and the amount of sludge to be displaced exceeds the pumping capacity of the pump 48. In this event sheared sludge accumulates in front of the scraper blade support arms 52 and eventually passes over the arms 52. However, with the provision of the auxiliary scraper blades 100 the sludge, which would otherwise be pushed to the outboard side of arms 52, is confined and prevented from being spread to the outboard edges of the arms 52 where the sludge would otherwise spill off the outboard edges of the arms 52.

With the provision of the auxiliary scraper blades 100 and cowling 102, the sludge is redirected back toward the center line of the frame 44 where it will be subsequently gathered by the rearward set of scraper blade support arms 52 when the direction of travel of the carriage assembly 40 is reversed. Thus, with this arrangement, sludge that has been sheared but not pumped will continue to be located within the span of the scraper blade support arms 52. Consequently the sludge can be gathered and displaced by the pump 48 through the hose 36 on a later pass on the scraper blade assembly 42.

Figure 11:
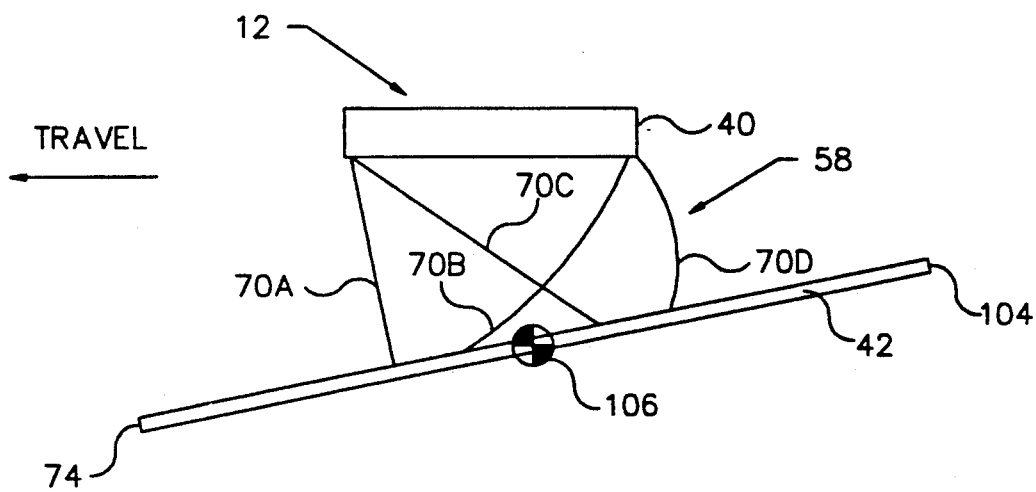
FIG. 11 is a schematic illustration of the undesired movement of the scraper blade assembly, which occurs without the benefits of the present invention, when the resistive force offered by the sludge bed to the shearing action of the scraper blades exceeds the design tractive force applied to the sludge bed.
Figure 12:
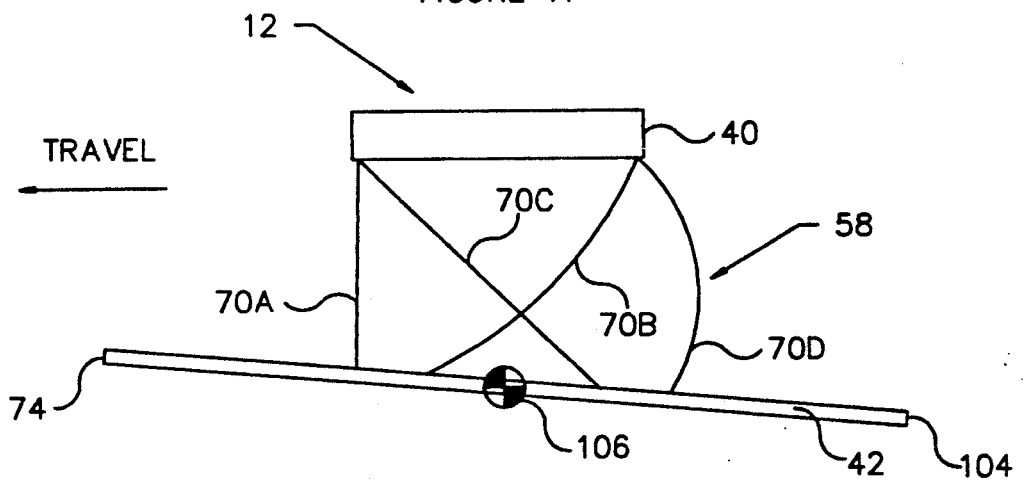
FIG. 12 is a view similar to FIG. 10, illustrating the adjusted position of the scraper blade assembly in accordance with the present invention responsive to an overload condition, as shown in FIG. 11, where the leading edge of the scraper blade assembly is raised upon adjustments to the suspension system.

Now referring to FIGS. 10–12, there is illustrated in a side view the relative movement between the upper floating carriage assembly 40 and the submerged lower carriage or scraper blade assembly 42 by provision of the suspension system 70 as discussed above. The lower carriage assembly includes the scraper blade support arms 52 on the frame 44 which includes the leading edge 74 also shown in FIGS. 10–12. Accordingly the opposite end of the scraper assembly 42 includes a trailing edge 104. The leading edge 74 precedes the scraper blade assembly 42 in the direction of travel. Of course in the reverse direction, the leading edge 74 becomes the trailing edge, and the trailing edge 104 becomes the leading edge.

FIG. 10 illustrates the static position of the scraper assembly 42 submerged to a desired operating depth with respect to the upper carriage assembly 40. The assembly 42 travels with the upper carriage 40 in the direction of the tractive force applied to the carriage 40 by the looped cable 18, as shown in FIG. 2. The magnitude of the applied tractive force or design load is equal in magnitude to the reaction force offered by the sludge bed to the scraper assembly 42 in the equilibrium position. In the nominal equilibrium position, the scraper assembly 42 is not translated relative to the upper carriage assembly 40 nor has it rotated. The design load applied by the upper carriage 40 to the scraper assembly 42 is equal to the maximum resistive force applied by the sludge bed to the scraper assembly 42 without translating or rotating the scraper assembly 42 relative to the carriage assembly 40.

The suspension system 70 includes the plurality of flexible chains or cables 70A, 70B, 70C, and 70D. The cables extend between the upper carriage assembly 40 and the scraper assembly 42 in a manner that permits adjustments to be made in the length of the respective cables between the assemblies 40 and 42.

The suspension system 70, as shown in FIG. 10, includes a leading set or pairs of cables 70A and 70C and a trailing set or pairs of cables 70B and 70D. Thus with this arrangement at least a pair of cables 70A is matched with a pair of cables 70C to form the leading set of cables. A trailing set of cables is formed by the pair of cables 70B matched with the pair of cables 70D.

When the device is not moving and loads are applied to scraper assembly 42, the weight of the lower carriage assembly 42 is supported by cables 70A, 70B, 70C, and 70D. In the dynamic equilibrium position of the scraper blade assembly 42 with the maximum applied shear load that will not cause substantial displacement of scraper assembly 42, only the leading set of cables 70A and 70C are carrying any load. The rearward set of cables 70B and 70D are slack. All of the forward tractive load applied to the scraper assembly 42 is applied through the cables 70A and 70C. The particular spacing of the cable pairs 70A, 70B, 70C and 70D relative to center of gravity 106 of the assembly 42 establishes the distribution of forces within the respective cables. Specifically the ratio of the distance of the pairs of cables 70A and 70D from the center of gravity 106 to the distance of the pairs of cables 70B and 70C from the center of gravity 106, and the total weight of the scraper blade assembly 42, establishes the tension load on the leading cables 70A and 70C.

By carefully selecting the relative distances between the cables, with respect to the center of gravity 106 and with respect to the weight of the assembly 42, it is possible at design load to control the tension in the cables so that the loading in the lead vertical cables 70A, for example, equals the tractive load applied to the upper carriage assembly 40. In addition, it is possible to use the applied tractive load to lift the leading edge of the assembly 42 when the applied tractive load exceeds the design criteria. In this manner, the overall sludge collection apparatus 12 tends to be self limiting to relieve excessive resistive shear loads applied by the sludge bed to the scraper assembly 42 as they occur.

Now referring to FIG. 11, there is illustrated the relative positioning of the scraper assembly 42 with respect to the upper carriage when the applied resistive shear load exceeds the load criteria of the suspension system 58 where the leading cable is not shortened on overload. This is the undesired position of the scraper assembly 42.

The scraper assembly 42 has a tendency to swing away and the leading edge 74 will swing downward relative to its equilibrium position, as illustrated in FIG. 10. The downward swinging action, of course, is undesirable and in most applications will not relieve the overload condition. This unwanted downward translation results in the leading edge 74 of the scraper assembly 42 engaging the sludge bed tending to obstruct continued forward movement. Accordingly, with the present invention, this undesirable displacement of the scraper assembly 42, when encountering an obstruction in the sludge bed, is overcome by automatically shortening the lead cables 70A when the applied tractive load exceeds design values. Thus, if the length of the leading cables 70A is not changed, then the undesirable downward displacement of the leading edge 74, as shown in FIG. 11, will occur.

Figure 13:
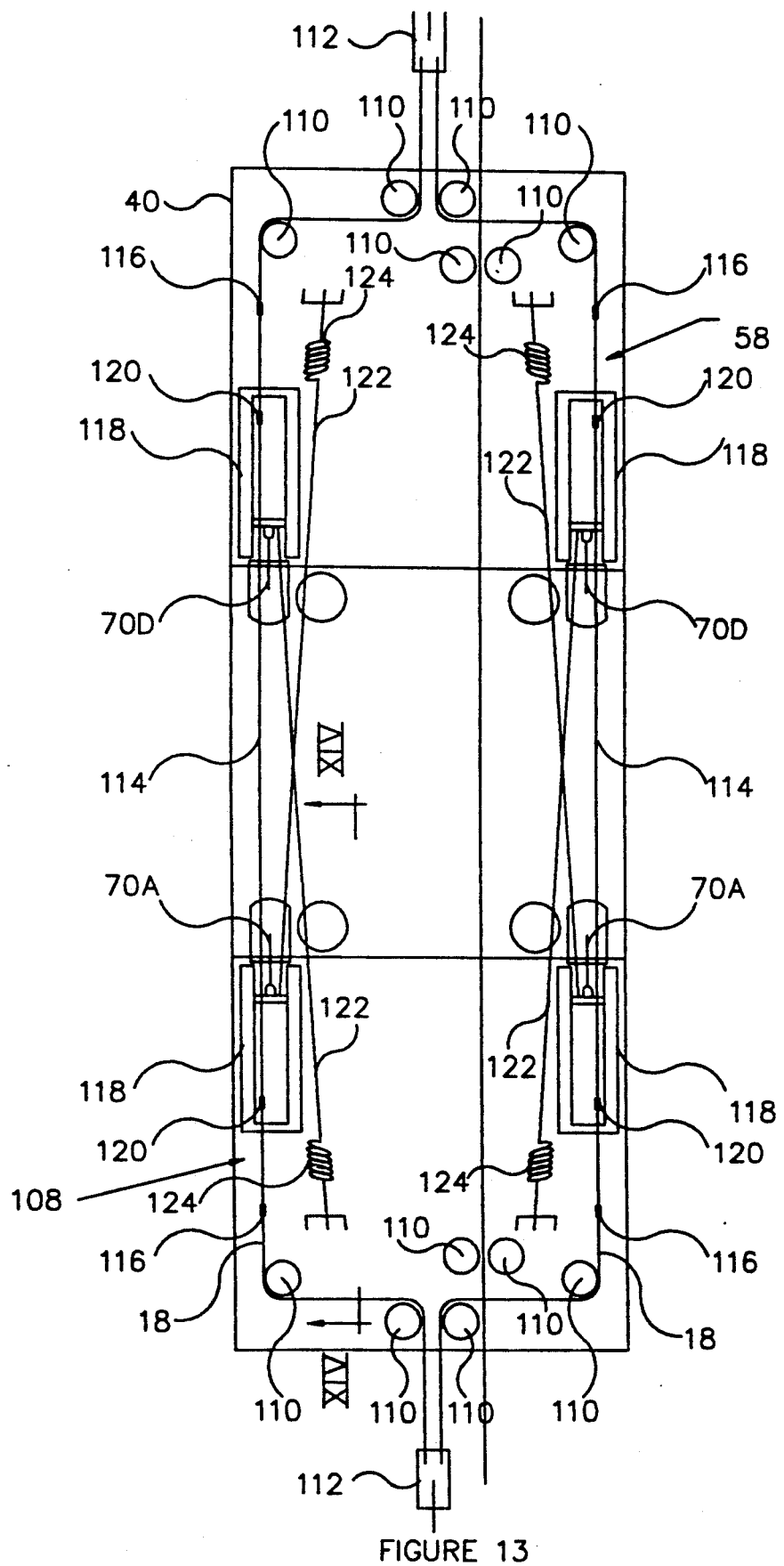
FIG. 13 is an enlarged schematic plan view of the mechanism for adjusting the suspension of the scraper blade assembly relative to the carriage.
Figure 14:
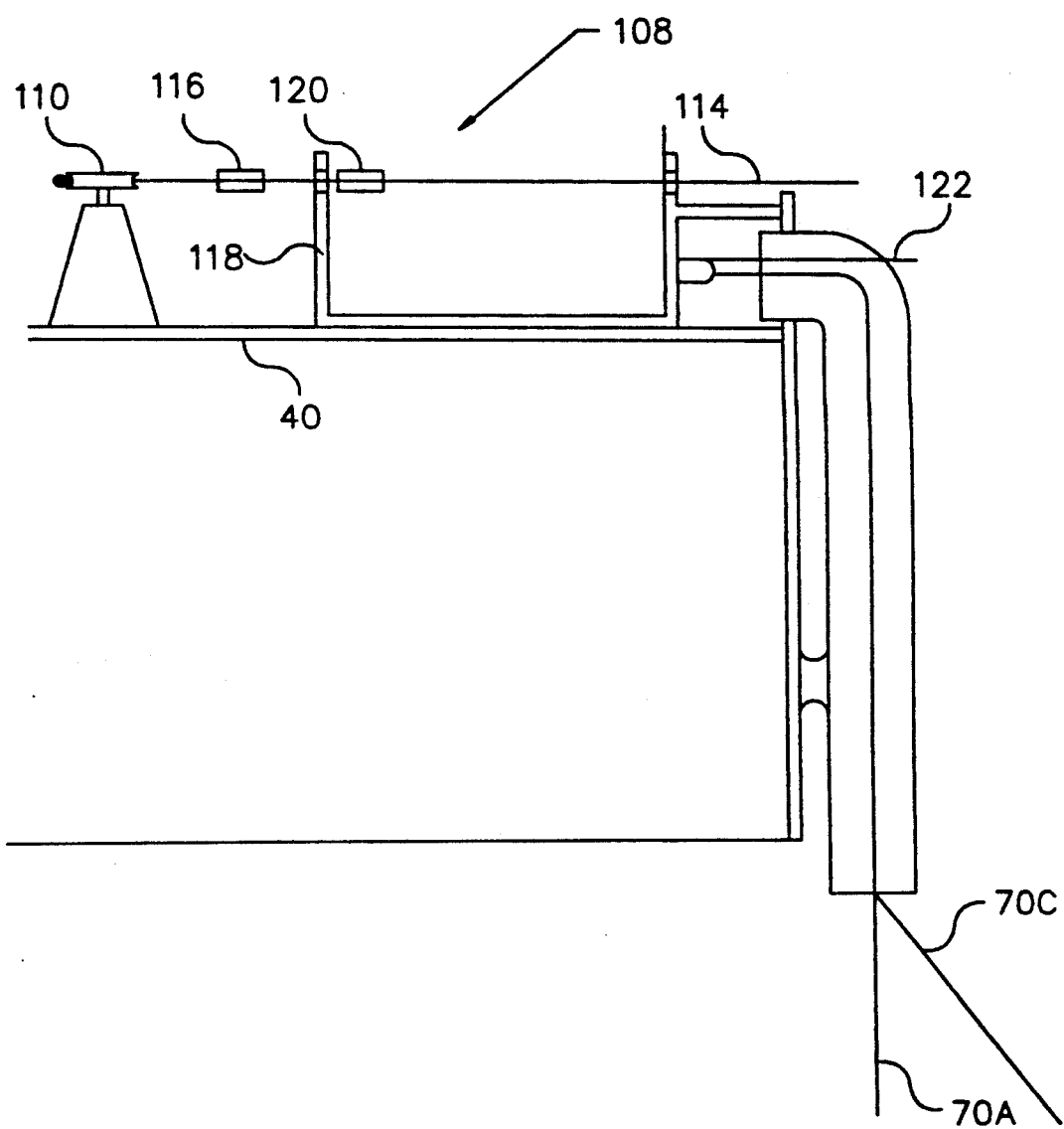
FIG. 14 is an enlarged fragmentary view in side elevation taken along line XIV—XIV of FIG. 13, illustrating a slide mechanism for controlling length of the cables in the raising and lowering of the leading edge of the scraper blades.

In accordance with the present invention, the undesirable downward tipping of the leading edge 74 is prevented and corrected by shortening the length of the leading cables 70A by operation of the apparatus shown in FIGS. 12-14. Thus, as shown in FIG. 12, in the event the resistive forces offered by the sludge bed to the shearing action of the scraper blade assembly 42 exceeds the design tractive force of the upper carriage assembly 40, an overload condition occurs. Thus, to prevent the downward tipping of the leading edge 74, the length of the leading set of cables 70A between the upper carriage assembly 40 and the scraper assembly 42 is shortened. This has the effect of moving the center gravity 106 of the scraper assembly 42 upwardly to raise the leading edge 74 relative to the trailing edge 104. The leading edge 74 is raised in elevation higher than the center of gravity 106 of the scraper assembly 42. This arrangement makes it possible to reduce the resistive force offered by the sludge bed on the scraper assembly 42, clear obstructions encountered, and/or decrease the density or viscosity of the sludge being pumped. The diagonal cables 70B serve to prevent the assembly 42 from swinging forward at less than design load.

Now referring to FIG. 13, there is illustrated the adjusting mechanism 108 on the upper carriage assembly 40 by which the lead cables 70A are shortened when an overload condition, as above described, is encountered. It should be noted that preferably two wire rope extension cables 18 pass through the adjusting system generally designated by the numeral 108. With this arrangement, the tension throughout the cable loop will not cause the lead cable to raise up.

The raising action of the lead cable is only propelled by the difference in the cable tension as applied to either end of the loading on upper carriage assembly 40. Thus the adjusting mechanism 108 serves as a compensation device so that the static cable tension in the propulsion loop is not relevant to the action of the scraper assembly 42. The scraper assembly 42 lifts up and swings away only in response to excessive resistive forces applied by the sludge bed to the shearing action of the scraper assembly 42.

As described above, the upper carriage 40 floats on the surface of the liquid in the settling tank 10 and is propelled through the settling tank on a looped cable 18 which extends around sheaves 110 mounted on the assembly 40. The cable 18 is clamped together adjacent to the end portions of the upper carriage assembly 40 by clamp plates 112, as shown in FIG. 13. The cable 18 is clamped to cable extensions 114 on the assembly 40 by clamps 116. The cable extensions 114 pass through shoes 118 slidable on the upper surface of the upper carriage assembly 40. The ends of the cables 70A and 70D extend through guide tubes which are connected to the assembly 40 as shown in FIG. 14 and are connected to the shoes 118, as shown in FIG. 13.

As shown in FIGS. 13 and 14, the cable extensions are freely movable through the shoes 118. On one side of the shoe, the clamps 116 serve as stops. In addition, shoe pick-up clamps 120 are connected to the extensions 114 on the other side of the shoes plus the combination of clamps 116 and 120 serve as stops for the cable portions 18 and extensions 114.

The cables 122 are connected at one end to the sliding shoes 118 and at the opposite end to springs 124 which are in turn mounted securely on the upper carriage assembly 40. With this arrangement, the tendency of the stops 120 to move shoes 118 in the direction of travel is countered by the springs 124.

In operation, the tractive force in the cable portions 18 tends to draw the stops 120 into contact with the sliding shoes 118 but the movement of the shoes 118 is restrained by the springs 124. When the tension in the cable extensions 114 reaches a predetermined magnitude to overcome the tension in the springs 124, the shoes 118 begin to move, thereby pulling the leading suspension cables, for example, cables 70A illustrated in FIG. 14, along, thereby shortening the effective length of suspension cables 70A. Consequently the leading edge 74 of the scraper blade assembly 42 is raised, as shown in FIG. 12.

With the above described arrangement illustrated in FIGS. 13 and 14, the springs 124 function to control or regulate the shortening of the lead suspension cables. Thus, depending on the direction of travel of the scraper assembly 42, the lead cables 70A and 70D shorten so that the leading edge 74 raises above the center of gravity 106 of the scraper assembly 42. Springs 124 serve the additional function of moderating or retarding the shortening of the lead cables upon the occurrence of an overload condition when the applied tractive load exceeds the design load as defined above. Thus the degree to which the lead cables is decreased in length is regulated.

If it is required to limit the raising of the lead cables so that the scraper assembly 42 maintains a horizontal position or tilts only slightly on an overload, selected devices, such as the springs 124 shown in FIG. 13 are utilized. It also should be understood that other control devices may be utilized, such as servomotors and the like, to achieve the same result. In another embodiment, a brake-type device is used in connection with the lead cables so that the lead cables would be permitted to pull up only when a measurement system attached to the scraper blade assembly 42 indicates that the leading edge 74 is beginning to tip downward below the center of gravity 106.

In operation the lead cables 70A are raised to the extent that the mechanism allows it to travel if additional forces, such as those applied by springs 124 are not available. The springs 124 are used to apply additional stiffness to the raise-up mechanism so as to control the rotation of the scraper assembly 42 as it raises up. Ideally, the assembly 42 would swing away and stay level or slightly raised at lead edge. Thus, the springs 124 serve to control the excessive rotation that could occur otherwise.

Additionally, clamps 116, which may, repositioned along cables 114, also serve as a travel stop for the raise-up mechanism. Clamp 116 bears upon shoes 118 which are those opposite the active shoes which are raising the cables 70A. Cables 114 pass through shoes 118 and the movement of the cable is unrestricted except for clamps 116 and clamps 120.

Further in accordance with the present invention, when the applied tractive load exceeds the design load, the lead cables 70A are raised up, thereby effectively shortening their suspending portion. To achieve this end, the tractive force which originates at cable 18 passes through clamp plates 112, onto the cable extension cables 114, on through pick-up clamp 120 and onto shoes 118. Shoe 118 also serves as an attachment point for leading cables 70A, as well as, cables 122 which are attached to springs 124. When the tractive load carried by cable 18 exceeds the sum of the static tension loads carried in cables 70A, the sliding shoes 118 translate in the direction of the applied load and, in turn, raise lead cables 70A and the front end of the submerged undercarriage assembly 42. In this fashion, the undercarriage assembly front end is raised up to allow it to pass over obstructions and relieve overloads while the scraper assembly 42 swings away, as shown in FIG. 12.

Thus, with the present invention, in the event it becomes difficult to shear the sludge bed, the scraper assembly 42 swings rearwardly and raises up to thereby decrease the engagement of the scraper blades into the sludge bed. When the scraper assembly 42 moves upwardly, the pump inlet 86 moves with it.

This allows less dense sludge to be removed from the top of the sludge bed or allows the addition of liquid to the pumpage, that would in either case tend to limit the specific gravity and viscosity of the sludge and thereby assure its pumpability. It is implicit in this arrangement that less dense sludge appears at the top of the sludge bed and liquid is immediately above the sludge bed. If it is desired to increase the design tractive load for a specific depth of operation, it is necessary to increase the weight of the scraper assembly 42 to "stiffen" the assembly.

Figure 15:
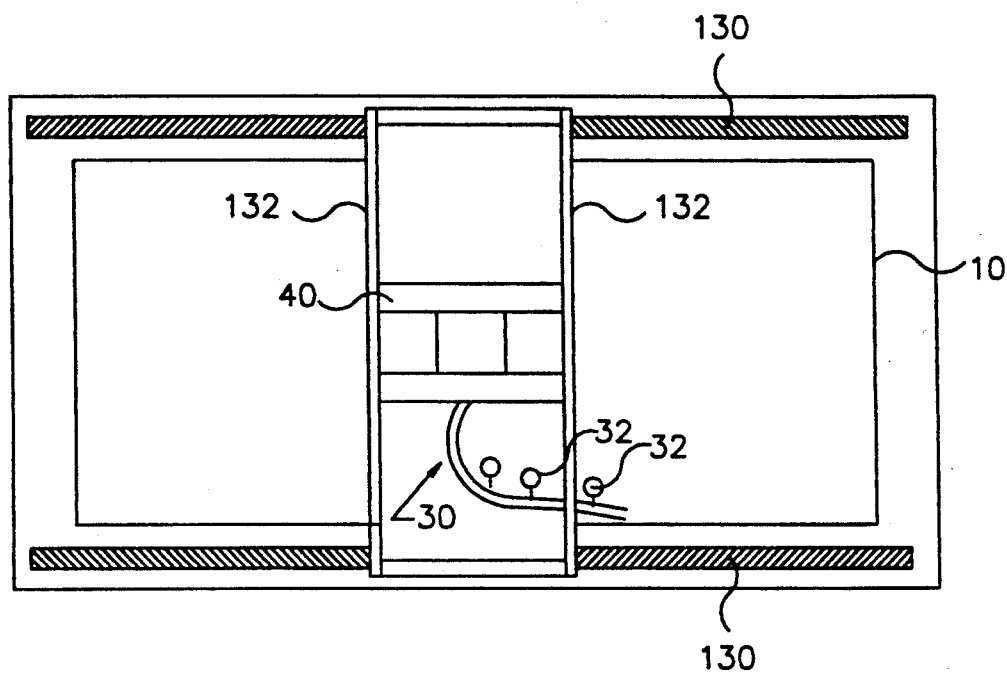
FIG. 15 is a schematic plan view of the sludge collection apparatus of the present invention, illustrating an embodiment with the upper carriage mounted on rails for translating the scraper blade assembly in the settling tank.
Figure 16:
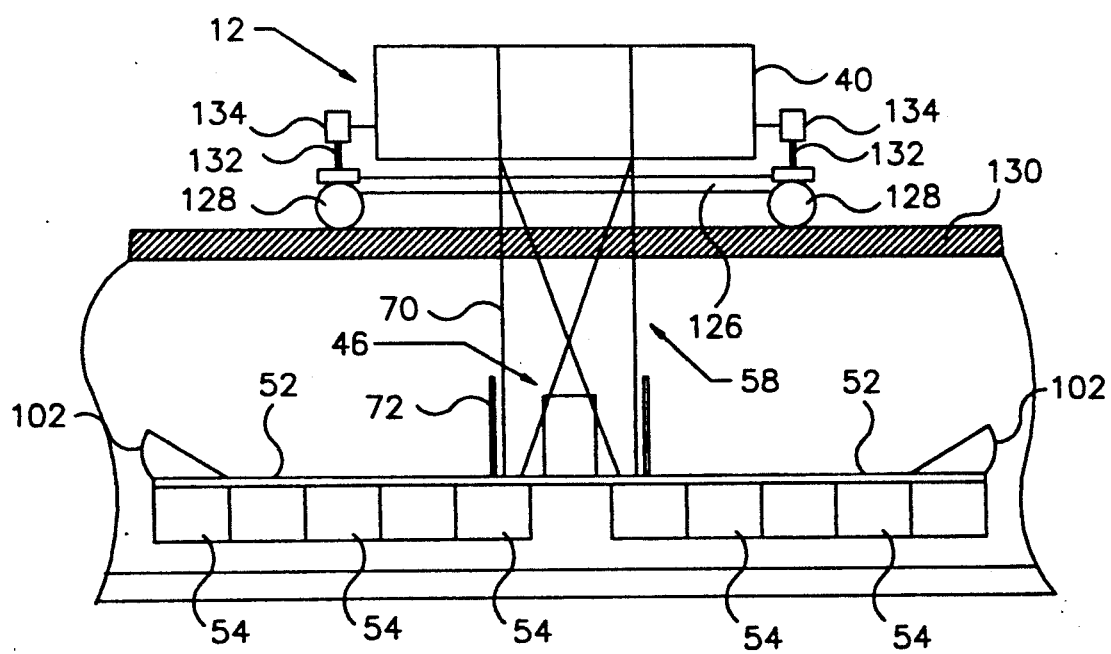
FIG. 16 is a view in side elevation of the rail mounted carriage assembly shown in FIG. 15.

Now referring to FIGS. 15 and 16, there is illustrated a rail mounted version of the sludge collection apparatus 12. This arrangement is distinguished from the floating arrangement illustrated in FIG. 2. With the rail mounted version, as shown in FIGS. 15 and 16, the upper carriage assembly 40 is positioned on a frame 126 having wheels 128 supported by rails 130 that extend the length of the settling tank 10. In addition, the upper carriage assembly 40 is supported on transverse rails 132. Thus, in this arrangement, the carriage 40 is traversed to preselected longitudinal position above the settling tank and then is traversed by conventional power means for movement of wheels 134 on the transverse rails 132.

Figure 17:
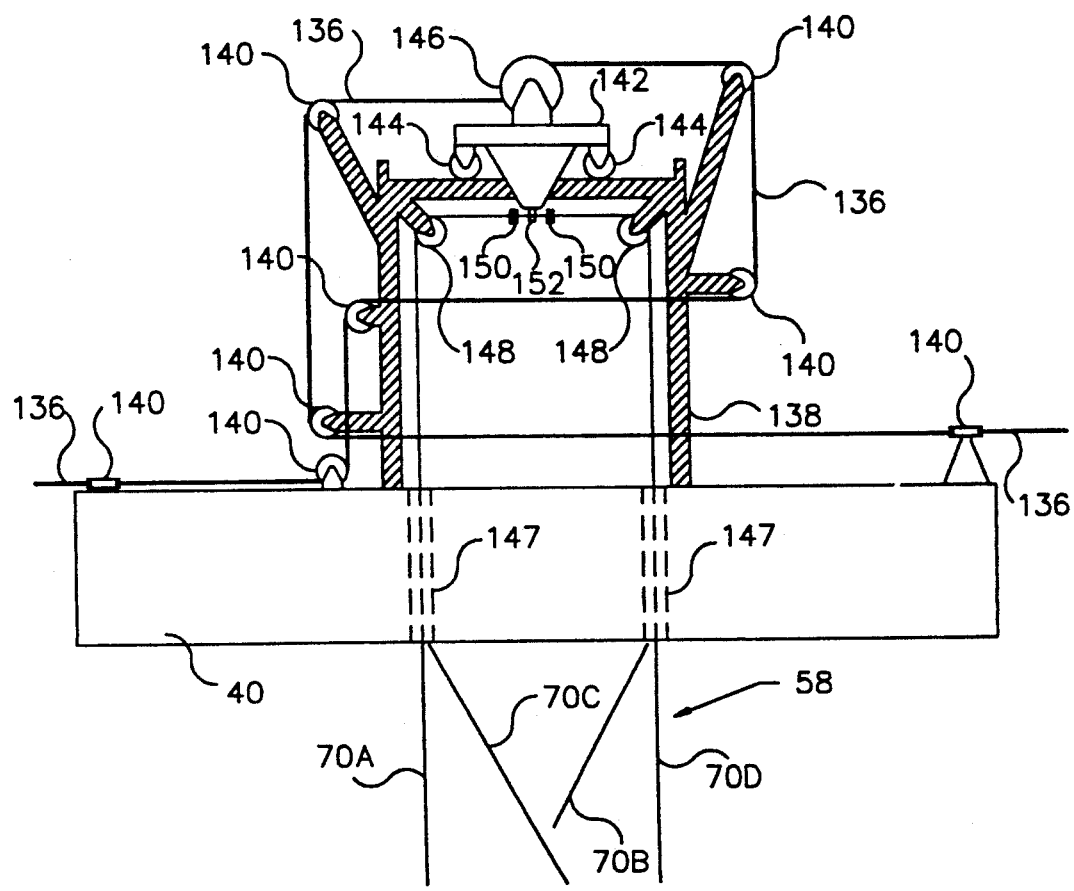
FIG. 17 is an enlarged fragmentary elevational view partially in section of a single cable system with an onboard winch for adjusting the position of the scraper blade assembly relative to the carriage.

Now referring to FIG. 17, there is illustrated a single cable propulsion system for the sludge collection apparatus 12. As above described with respect to the propulsion system shown in FIG. 2, a looped cable 18 is used to propel the upper carriage assembly 40. With the arrangement shown in FIG. 17, a single cable 136 is utilized to propel the upper carriage assembly 40. The single cable 136 is supported by a frame 138 which extends upwardly from the upper carriage assembly 40. The frame 138 is provided with a plurality of idler pulleys 140 around which the cable 136 extends. Movable on the frame 138 is a bed 142 having wheels 144, movable on the upper surface of the frame 138. The bed 142 includes a power driven winch 146 around which the cable 136 extends.

The suspension cables 70A and 70D extend upwardly through guide tubes 147 around idler pulleys 148 and are connected to pick up clamps 150 which operate in the manner above described, with respect to the clamps 116 and 120, illustrated in FIG. 14. An eye 152 extends downwardly from the movable bed 142, and the suspension cables extend through the eye 152. Accordingly, the shortening of the respective leading suspension cables 70A, 70D operates in the same manner as above described to compensate for increases in the resistive force offered by the sludge bed to the shearing action of the scraper blade assembly 42.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. Apparatus for sludge collection comprising:
   an upper carriage;
   a scraper assembly having a leading edge;
   suspension means for suspending said scraper assembly from said carriage at a desired depth in a settling tank in relation to the surface of fluid in the settling tank, said suspension means including a plurality of leading suspension members extending between said scraper assembly and said upper carriage;
   means for applying a tractive force to said upper carriage to forwardly propel said upper carriage to relatively position said scraper assembly into contact with a sludge bed in the settling tank for shearing layers of sludge from the bed;
   means for automatically raising said scraper assembly and shortening the length of said leading suspension members to raise said leading edge of said scraper assembly upon encountering an obstruction of the sludge bed to forward movement of the scraper assembly to permit said scraper assembly to transverse said obstruction;

said scraper assembly having a centrally located sludge collector; and pump means movable with said scraper assembly for delivering dislodged sludge from said central sludge collector out of the settling tank.

2. The apparatus of claim 1 which includes:

means for supporting said upper carriage for floatation on the surface of a settling tank.

3. The apparatus of claim 1 which includes:

means for adjusting the depth of said scraper assembly below said upper carriage.

4. The apparatus of claim 1 wherein:

said suspension means is flexible.

5. The apparatus of claim 1 wherein:

said scraper assembly includes a pair of blades positioned in a "V" configuration with an open end of the "V" configuration facing in the direction of travel.

6. The apparatus of claim 1 wherein:

said scraper assembly includes a plurality of scraper blades positioned in an "X" configuration with an open end of the "X" configuration facing in the direction of travel.

7. The apparatus of claim 1 which includes:

means for limiting the intake of material to said pump means to the direction of said upper carriage.

8. The apparatus of claim 1 which includes:

cowling means for controlling the flow of sludge over and around said scraper assembly.

9. The apparatus of claim 1 wherein:

said pump means is detachably-mounted on said scraper assembly.

10. The apparatus of claim 9 which includes:

means for elevating said pump means relative to said scraper assembly.

11. The apparatus of claim 1 which includes:

means for propelling said upper carriage horizontally where the line of action can be relocated to effect varying paths of travel.

12. The apparatus of claim 3 which includes:

means for changing the weight of said scraper assembly.

13. The apparatus of claim 4 which includes:

means for remotely adjusting the depth of suspension of said submerged scraper assembly.

14. The apparatus of claim 1 which includes:

a plurality of blades extending from said scraper assembly, said blades being fabricated of a resilient material.

15. The apparatus of claim 1 in which:

said suspension means is adjustable to various lengths to effectively regulate the depth at which said scraper assembly acts thereby allowing adjustment for different settling tank depths or for successive removal or various sludge layers from the top down.

16. The apparatus of claim 1 which includes:

means for translating increased tractive load in drawing across a pond while shortening said leading suspension members to raise said leading edge of said scraper assembly upon encountering an obstruction.

17. Apparatus for sludge collection comprising:

an upper carriage;

a scraper assembly having a leading edge for shearing sludge from a sludge bed fixed in a settling tank and a trailing edge;

tractive means for applying a design tractive force to said upper carriage to propel said carriage and advance said scraper assembly into the sludge bed to shear sludge from the fixed bed;

suspension means extending between said scraper assembly and said carriage for suspending said scraper assembly at a desired depth in the settling tank in relation to the surface of fluid in the settling tank, said suspension means including leading suspension members;

adjusting means for changing the length of said leading suspension members between said upper carriage and said scraper assembly to both vertically raise said trailing edge in the direction of travel of said scraper assembly to relieve excessive resistive shear loads applied by the sludge bed to said scraper assembly;

means for automatically initiating a change in the depth of said scraper assembly in the settling tank and the length of the leading suspension members when the resistive force applied by the sludge bed to said scraper assembly exceeds the design tractive force applied to said upper carriage; and means movable with said scraper assembly for pumping the sludge sheared from the fixed bed out of the settling tank.

18. The apparatus of claim 17 which includes:

means for raising said leading edge of said scraper assembly when the design resistive load exceeds the design tractive force.

19. The apparatus of claim 17 which includes:

means for raising said leading edge of said scraper assembly upon encountering resistive load exceeding the design load wherein said leading suspension members is located ahead of the center of gravity of said scraper assembly in such a manner that the tension in said leading suspension members equals the design tractive loading and the applied tractive load is used to lift said leading edge of said scraper assembly.

20. The apparatus of claim 17 which includes:

means for raising said leading edge of said scraper assembly upon encountering resistive load exceeding the design load, wherein said leading edge is raised to an elevation above the center of gravity of said scraper assembly.

21. In sludge collection, a method for regulating the positioning of a submerged undercarriage in relation to a sludge layer of a sedimentation tank comprising the steps of:

suspending the undercarriage in the sedimentation tank;

applying a tractive load to the undercarriage to forwardly traverse the undercarriage in contact with a fixed sludge bed in the sedimentation tank;

removing sludge from the bed by the undercarriage successively shearing layers of the sludge from the fixed sludge bed in the sedimentation tank;

sensing the tractive load applied by the undercarriage upon shearing the sludge layer; and adjusting the length of means for suspending the undercarriage in the tank by the combined raising and rearwardly moving the undercarriage to limit the tractive load required to shear the sludge layer.

22. A method for removing sludge from a settling tank comprising the steps of:

suspending a scraper assembly submerged at a preselected depth in the settling tank from a floating carriage;

adjusting the suspension of the submerged scraper assembly to vertically raise and lower the scraper assembly to a desired depth in the settling tank in relation to a fixed bed of the sludge present in the settling tank;

transversing the submerged scraper assembly in contact with the sludge to shear successive layers of sludge from the bed;

collecting the sheared sludge at a preselected depth in the settling tank in a sludge collector positioned at the center of the scraper assembly;

pumping sludge from the sludge collector as the scraper assembly traverses the fixed sludge bed at a preselected depth in the settling tank; and translating the floating upper carriage in both directions along the length of the settling tank.

23. The method of claim 22 including:

adjusting the distance between the submerged scraper assembly and the floating upper carriage.

24. The method of claim 23 including:

translating the upper carriage across the settling tank along one line; and moving the floating upper carriage to a different line; and translating said floating upper carriage along the different line.

* * * * *